(12) United States Patent
Muto et al.

(10) Patent No.: US 8,570,420 B2
(45) Date of Patent: Oct. 29, 2013

(54) IMAGE PICKUP SYSTEM, IMAGE PICKUP APPARATUS AND SENSITIVITY CONTROL METHOD FOR CORRECTING SENSITIVITY OF AN IMAGE PICKUP APPARATUS USING AN ELECTRON MULTIPLYING-CHARGE COUPLED DEVICE

(75) Inventors: Yutaka Muto, Tokyo (JP); Akira Fukushima, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 222 days.

(21) Appl. No.: 13/064,158

(22) Filed: Mar. 9, 2011

(65) Prior Publication Data

US 2011/0261234 A1    Oct. 27, 2011

(30) Foreign Application Priority Data

Apr. 21, 2010    (JP) .................................. 2010-097689

(51) Int. Cl.
*H04N 3/14*    (2006.01)
*H04N 5/335*   (2011.01)
*H04N 5/235*   (2006.01)

(52) U.S. Cl.
USPC ........................................ 348/311; 348/229.1

(58) Field of Classification Search
USPC ...................... 348/294, 300, 301, 311, 229.1; 250/305, 311
See application file for complete search history.

(56) References Cited

U.S. PATENT DOCUMENTS

| | | | |
|---|---|---|---|
| 2006/0163503 A1* | 7/2006 | Urano et al. | 250/559.42 |
| 2007/0263094 A1* | 11/2007 | Fukushima | 348/207.99 |
| 2008/0055600 A1* | 3/2008 | Kawaguchi | 356/407 |
| 2008/0074526 A1* | 3/2008 | Nakamura | 348/311 |
| 2011/0049337 A1* | 3/2011 | Taira et al. | 250/216 |

* cited by examiner

*Primary Examiner* — Kelly L Jerabek
(74) *Attorney, Agent, or Firm* — Bacon & Thomas, PLLC (57) ABSTRACT

An image pickup system includes a plurality of electron multiplication image pickup apparatuses; and a correction coefficient calculating device. The correction coefficient calculating device measures electron multiplication properties of image signals output from the electron multiplication image pickup apparatuses on a regular basis, calculates correction coefficients that are used to adjust the sensitivity of image signals from the electron multiplication apparatus, and sets the calculated correction coefficients in the electron multiplication image pickup apparatuses.

9 Claims, 8 Drawing Sheets

IMAGE PICKUP APPARATUS 1-1,1-3

| SETTING VALUE | APPLYING VALUE |
|---|---|
| 50 | 45 |
| 100 | 90 |
| 150 | 135 |
| 200 | 180 |
| 250 | 225 |
| 300 | 270 |
| 350 | 315 |
| 400 | 360 |
| 450 | 405 |
| 500 | 450 |
| 550 | 495 |
| 600 | 540 |

K= 0.90

IMAGE PICKUP APPARATUS 1-4

| SETTING VALUE | APPLYING VALUE |
|---|---|
| 50 | 48.5 |
| 100 | 97 |
| 150 | 145.5 |
| 200 | 194 |
| 250 | 242.5 |
| 300 | 291 |
| 350 | 339.5 |
| 400 | 388 |
| 450 | 436.5 |
| 500 | 485 |
| 550 | 533.5 |
| 600 | 582 |

K= 0.97

IMAGE PICKUP APPARATUS 1-5

| SETTING VALUE | APPLYING VALUE |
|---|---|
| 50 | 47.5 |
| 100 | 95 |
| 150 | 142.5 |
| 200 | 190 |
| 250 | 237.5 |
| 300 | 285 |
| 350 | 332.5 |
| 400 | 380 |
| 450 | 427.5 |
| 500 | 475 |
| 550 | 522.5 |
| 600 | 570 |

IMAGE PICKUP SYSTEM, IMAGE PICKUP APPARATUS AND SENSITIVITY CONTROL METHOD FOR CORRECTING SENSITIVITY OF AN IMAGE PICKUP APPARATUS USING AN ELECTRON MULTIPLYING-CHARGE COUPLED DEVICE

FIELD OF THE INVENTION

The present invention relates to an image pickup apparatus such as a television camera or the like; and, more particularly, to a method and a system for correcting the sensitivity of an image pickup apparatus using an electron multiplying-charge coupled device.

BACKGROUND OF THE INVENTION

Conventionally, there have been disclosed an image pickup apparatus which obtains a clear image under a low illuminance condition by taking images of a target object by use of an electron multiplying-charge coupled device (EM-CCD) and a method of making the sensitivity of an output image uniform by controlling the EM-CCD to be cooled at a predetermined level (see, e.g., Japanese Patent Application Publication No. 2007-318735).

Figure 4:
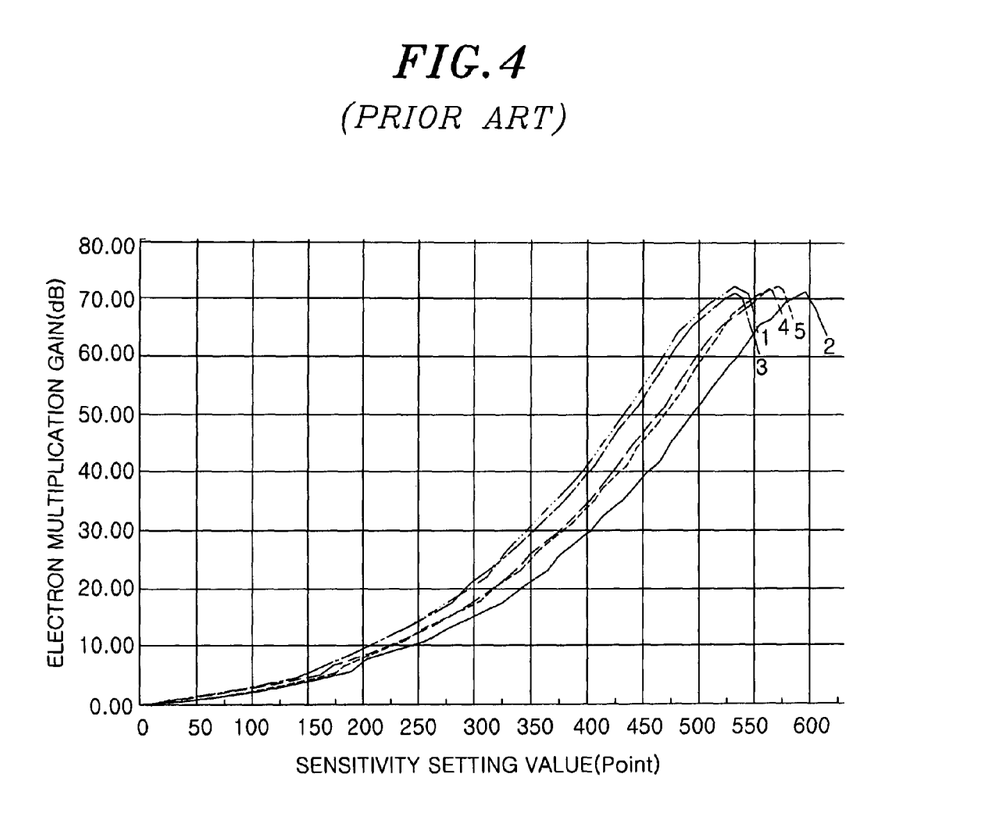
FIG. 4 is a graph showing electron multiplication properties of image pickup apparatuses before being corrected in accordance with the first embodiment of the present invention.

A plurality of image pickup apparatuses using such EM-CCDs are installed and images output therefrom are recorded or displayed on monitors to be monitored by users. However, as shown in FIG. 4, variations exist in the electron multiplication properties of the EM-CCDs. Accordingly, even if the sensitivities of the image pickup apparatuses are set as an identical value, sensitivity differences may occur in images output therefrom due to such variations, especially when an amplification performed by an amplifier unit exceeds an upper limit (or a predetermined upper limit). Therefore, for example, when the images with the sensitivity differences are displayed on monitors, it sometimes becomes difficult to distinguish and compare the images and thus monitor important matters such as an intruder and the like, which may cause such important matters to be missed.

SUMMARY OF THE INVENTION

In view of the above, the present invention provides an image pickup system, an image pickup apparatus and a sensitivity control method, which reduces sensitivity differences of images output from a plurality of image pickup apparatuses.

In accordance with an aspect of the present invention, there is provided an image pickup system including a plurality of electron multiplication image pickup apparatuses; and a correction coefficient calculating device for measuring electron multiplication properties of image signals output from the electron multiplication image pickup apparatuses, calculating correction coefficients that are used to adjust the sensitivity of image signals from the electron multiplication apparatus, and setting the calculated correction coefficients in the electron multiplication image pickup apparatuses.

The correction coefficient calculating device may measure electron multiplication properties of image signals output from the electron multiplication image pickup apparatuses on a regular basis, and compare an initially measured electron multiplication property with a most recently measured electron multiplication property for each of the electron multiplication image pickup apparatuses and, if the difference between the initially measured electron multiplication property and the most recently measured electron multiplication property is equal to or greater than threshold, output an alarm signal to the outside.

The correction coefficient calculating device may measure electron multiplication properties of image signals output from the electron multiplication image pickup apparatuses on a regular basis, and compare an initially measured electron multiplication property with a most recently measured electron multiplication property for each of the electron multiplication image pickup apparatuses and control each of the electron multiplication, image pickup apparatuses such that the difference between the initially measured electron multiplication property and the most recently measured electron multiplication property does not exceed a threshold value.

In accordance with another aspect of the present invention, there is provided an image pickup apparatus including an electron multiplying-charge coupled device for obtaining an image signal by performing a photoelectric conversion on an incident light and carrying out an electron multiplication on the image signal at a electron multiplication factor to generate an image signal output; a memory unit for storing a correction coefficient; a sensitivity setting unit for setting a sensitivity value for the image signal; and a control unit for controlling the electron multiplying-charge coupled device based on a value obtained by multiplying the sensitivity value by the correction coefficient stored in the memory unit.

The control unit may regularly receive electron multiplication properties measured outside the image pickup apparatus; and compare an initially measured electron multiplication property with a most recently measured electron multiplication property for each of the image pickup apparatuses and, if the difference between the initially measured electron multiplication property and the most recently measured electron multiplication property is equal to or greater than a threshold, output an alarm signal to the outside.

The control unit may regularly receive electron multiplication properties measured outside the image pickup apparatus; and compare an initially measured electron multiplication property with a most recently measured electron multiplication property for each of the image pickup apparatuses and controls the electron multiplying-charge coupled device such that the difference between the initially measured electron multiplication property and the most recently measured electron multiplication property does not exceed a threshold value.

In accordance with still another aspect of the present invention, there is provided a sensitivity control method. The method includes measuring electron multiplication properties of an image signal output from an electron multiplication image pickup apparatus; setting a sensitivity value for the image signal; correcting the sensitivity value by multiplying the sensitivity value by a correction coefficient calculated based on the measured electron multiplication properties; and controlling the electron multiplication image pickup apparatus based on the corrected sensitivity value.

The measuring of the electron multiplication properties may be performed on a regular basis, and the method may further include comparing an initially measured electron multiplication property with a most recently measured electron multiplication property; and outputting an alarm signal to the outside, if the difference between the initially measured electron multiplication property and the most recently measured electron multiplication property is equal to or greater than a threshold.

The measuring of the electron multiplication properties may be performed on a regular basis, and the method may further include comparing an initially measured electron multiplication property with a most recently measured electron multiplication property; and controlling the electron multiplication image pickup apparatus such that the difference between the initially measured electron multiplication property and the most recently measured electron multiplication property does not exceed a threshold value.

In accordance with the present invention, it is possible to provide a plurality of image pickup apparatuses and an image pickup system including the same, capable of outputting images with reduced sensitivity differences.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Embodiments of the present invention will now be described with reference to the accompanying drawings which form a part hereof.

First Embodiment

Figure 1:
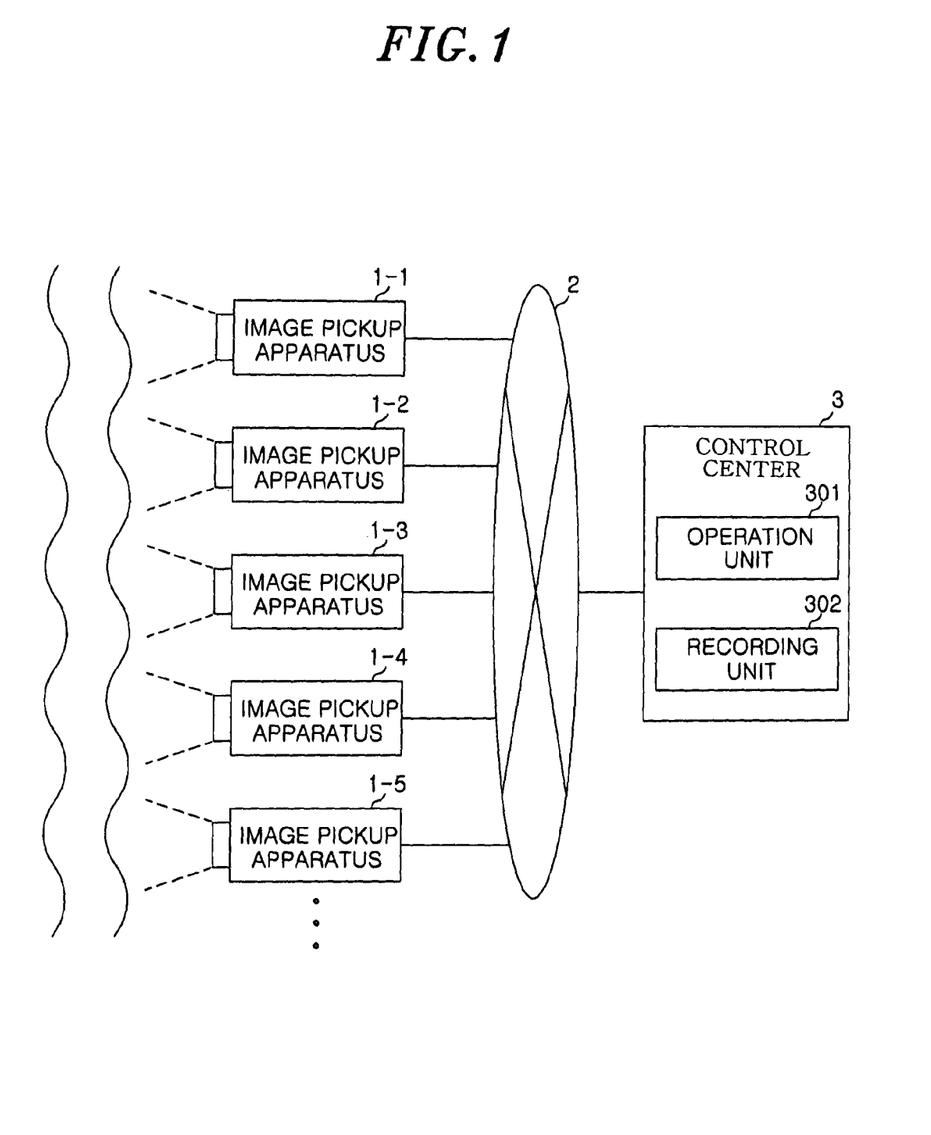
FIG. 1 is a block diagram showing an example of a structure of an image pickup system in accordance with a first embodiment of the present invention.

As shown in FIG. 1, the image pickup system of the present embodiment includes image pickup apparatuses 1-1 to 1-5 (collectively, referred to as "1"); a network 2 such as a local area network (LAN); and a control center 3 for storing images output from the image pickup apparatuses 1 and remotely controlling the image pickup apparatuses 1. The control center 3 includes an operation unit 301 for calculating a correction coefficient K which is used to reduce or remove differences between the electron multiplication properties related to sensitivities (hereinafter, referred to as "sensitivity setting values") set to the image pickup apparatus 1; and applying the correction coefficient K to each of the image pickup apparatuses 1; and a recording unit 302 for recording, e.g., images taken by the image pickup apparatuses 1. In the present embodiment, five image pickup apparatuses are taken as an example. However, the image pickup system may include two or more image pickup apparatuses.

Each of the image pickup apparatuses 1-1 to 1-5 take images of a target area and compresses corresponding image data in a predetermined compression format to transmit it to control center 3 through the network 2. The control center 3 receives the image data and records it in the recording unit 302.

In the image pickup apparatuses 1, image data may be compressed in a predetermined compression format, e.g., moving picture experts group phase 4 (MPEG-4), H.264, joint photographic experts group 2000 (JPEG 2000) or the like.

Figure 3:
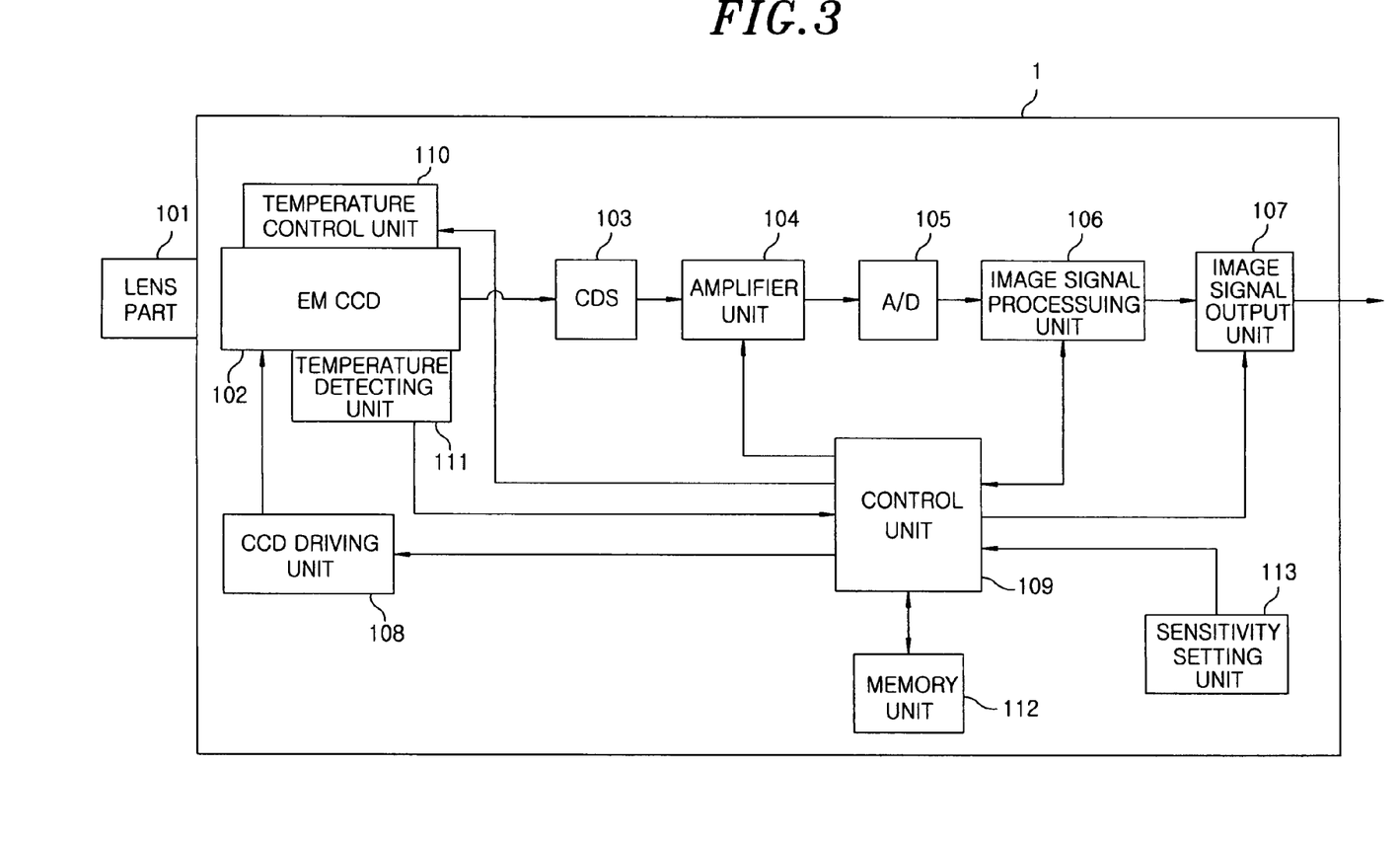
FIG. 3 is a block diagram showing a structure of an image pickup apparatus in accordance with the first embodiment of the present invention.

FIG. 3 is a block diagram showing a structure of an image pickup apparatus 1 in accordance with the present embodiment of the present invention. Further, only parts that are necessary to describe the image pickup apparatus 1 of the present embodiment are shown in FIG. 3.

As shown in FIG. 3, the image pickup apparatus 1 of the present embodiment includes a lens part 101 for forming an image of incident light; an electron multiplying-charge coupled device (EM-CCD) 102 for converting a light introduced from the lens unit 101 into an electric signal; a correlated doubled sampling (CDS) unit 103 for eliminating noises from the electric signal output from the EM-CCD 102; an amplifier unit 104 for adjusting a gain of a signal output from the CDS unit 103; an analog digital (A/D) converter 105 for converting an analog signal output from the amplifier unit 104 into a digital signal; an image signal processing unit 106 for performing various image processes on a signal; and an image signal output unit 107 for converting a signal output from the image signal processing unit 106 into an image signal of a predetermined type to output the image signal.

The image pickup apparatus 1 further includes a CCD driving unit 108 for driving the EM-CCD 102 and performing gain control of the electron multiplication; a control unit 109 formed of, e.g., a central processing unit (CPU) or the like for controlling each unit in the image pickup apparatus 1; a temperature control unit 110 for cooling or heating the EM-CCD 102; a temperature detecting unit 111 for detecting the temperature of the EM-CCD 102; a memory unit 112 for storing correction coefficient information of the EM-CCD 102; and a sensitivity setting unit 113 for setting an electron multiplication factor of the EM-CCD 102.

The image signal of the predetermined type that is output from the image signal output unit 107 is a motion image or a still image of, e.g., a national television system committee (NTSC) type, a phase alternating by line (PAL) type, a high definition television (HDTV) type or the like.

The EM-CCD 102 of the image pickup apparatus 1 photoelectrically converts incident lights imaged on photoelectric conversion units by the lens part 101 into electric signals and outputs the converted electric signals to the CDS unit 103. The CDS unit 103 removes noises from the signals output from the EM-CCD 102 and outputs resultant signals to the amplifier unit 104. The amplifier unit 104 amplifies the signals output from the CDS unit 103 depending on a gain control signal output from the control unit 109 and outputs the amplified signals to the A/D converter 105.

The A/D converter 105 converts the analog signals output from the amplifier unit 104 into digital signals of, e.g., 10 bits and outputs the digital signals to the image signal processing unit 106. The image signal processing unit 106 performs various image processes such as gamma correction, contour enhancement and the like on the received signals and outputs resultant signals to the image signal output unit 107. The image signal output unit 107 converts the signals output from the image signal processing unit 106 into image signals of a predetermined type and outputs the converted signals.

In the meantime, the sensitivity setting unit 113 outputs to the control unit 109 a signal based on a desired sensitivity setting value that is directly or remotely controlled and set by an operator. The control unit 109 reads out from the memory unit 112 the correction coefficient K of the electron multiplication property and outputs a control signal to the CCD driving unit 108, the control signal serving to control the electron multiplication factor based on an actual sensitivity value (hereinafter, referred to as "sensitivity applying value") calculated by multiplying the sensitivity value by the correction coefficient K. The CCD driving unit 108 outputs a signal for driving the EM-CCD 102 depending on the control signal output from the control unit 109 and/or another control signal for adjusting the electron multiplication factor.

Further, the control unit 109 controls the temperature control unit 110 to maintain the temperature of the EM-CCD 102 at a predetermined level based on the temperature of the EM-CCD 102, obtained from the temperature detecting unit 111. The temperature control unit 110 is formed of a thermoelectric element for converting electric energy to thermal energy, e.g., a Peltier element capable of performing temperature control depending on a supplied current.

As for the Peltier element, the temperature of one surface thereof is reduced and the temperature of the other surface thereof is raised by increasing the supplied current. In the present embodiment shown in FIG. 3, the temperature control unit 110 includes the Peltier element. By attaching the surface of the Peltier element, the temperature of which is reduced by increasing the current supplied thereto, to a surface of the EM-CCD 102 which is opposite to the imaging surface thereof, the Peltier element is used as a cooling device for cooling the EM-CCD 102.

In the above, the typical imaging operation has been described. Hereinafter, a method for correcting the electron multiplication properties of the image pickup apparatuses 1 in accordance with the present invention will be described with reference to FIGS. 1 to 7.

Figure 2:
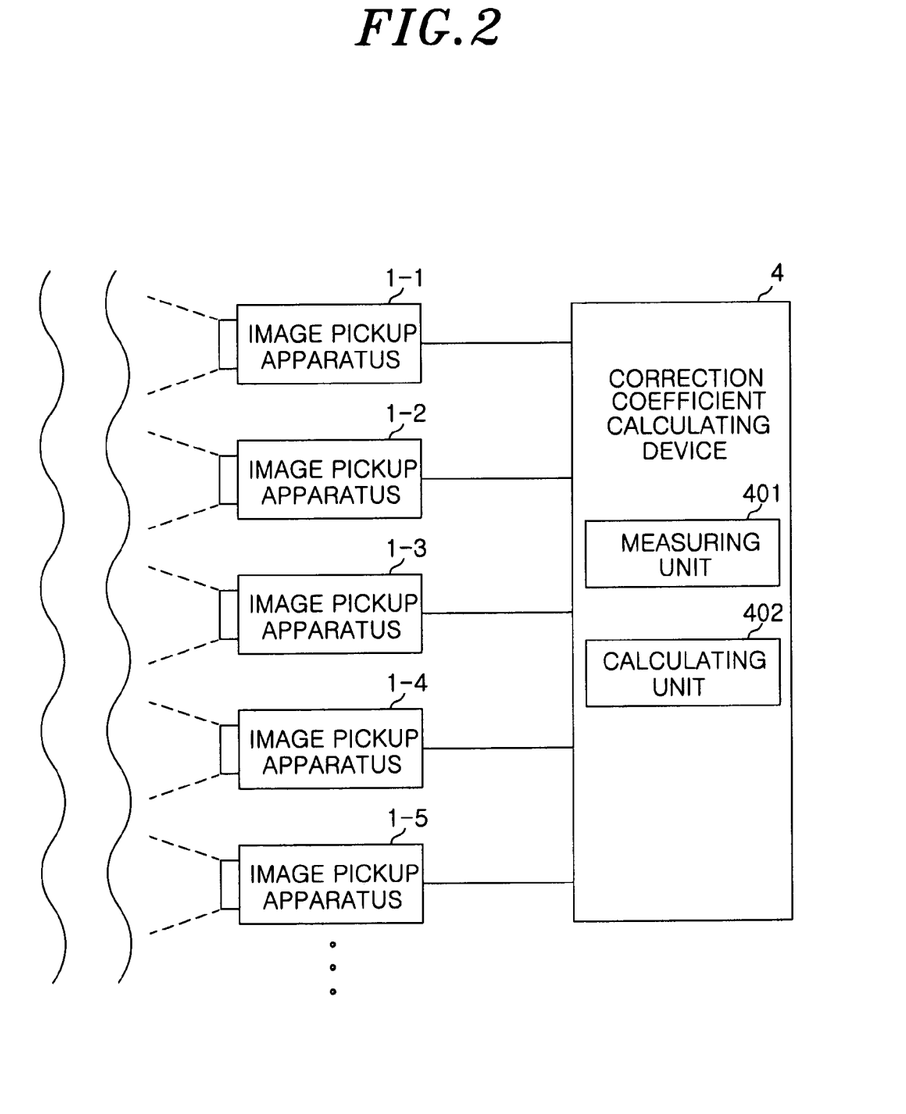
FIG. 2 is a block diagram showing another example of a structure of an image pickup system in accordance with the first embodiment of the present invention.
Figure 5:
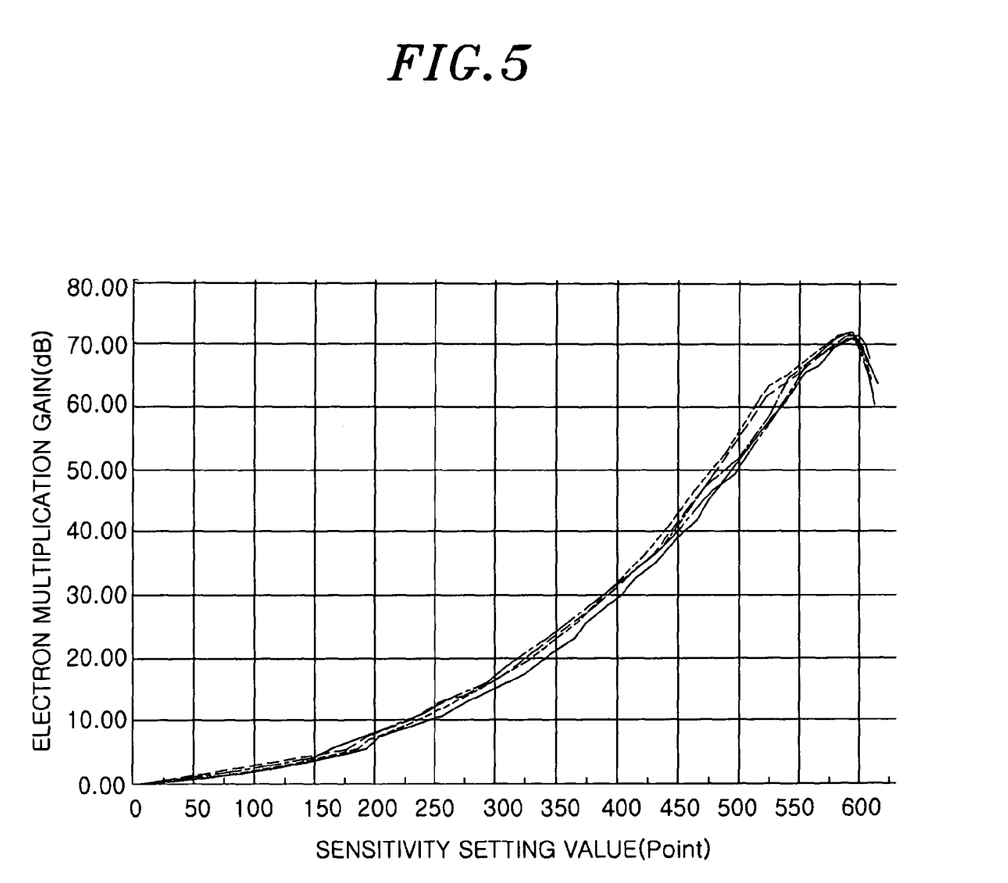
FIG. 5 is a graph showing electron multiplication properties of image pickup apparatuses after being corrected in accordance with the first embodiment of the present invention.
Figure 6:
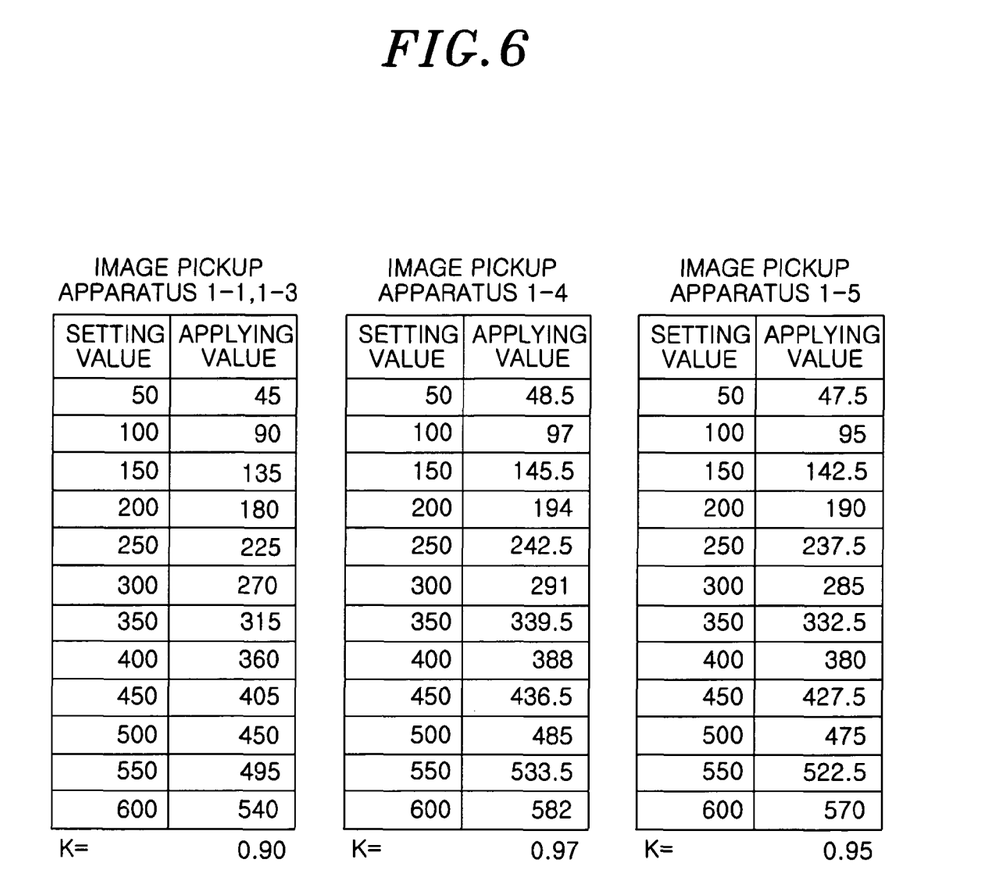
FIG. 6 is a matrix view showing a relationship between a sensitivity setting value and a sensitivity applying value of the image pickup apparatus in accordance with the first embodiment of the present invention.
Figure 7:
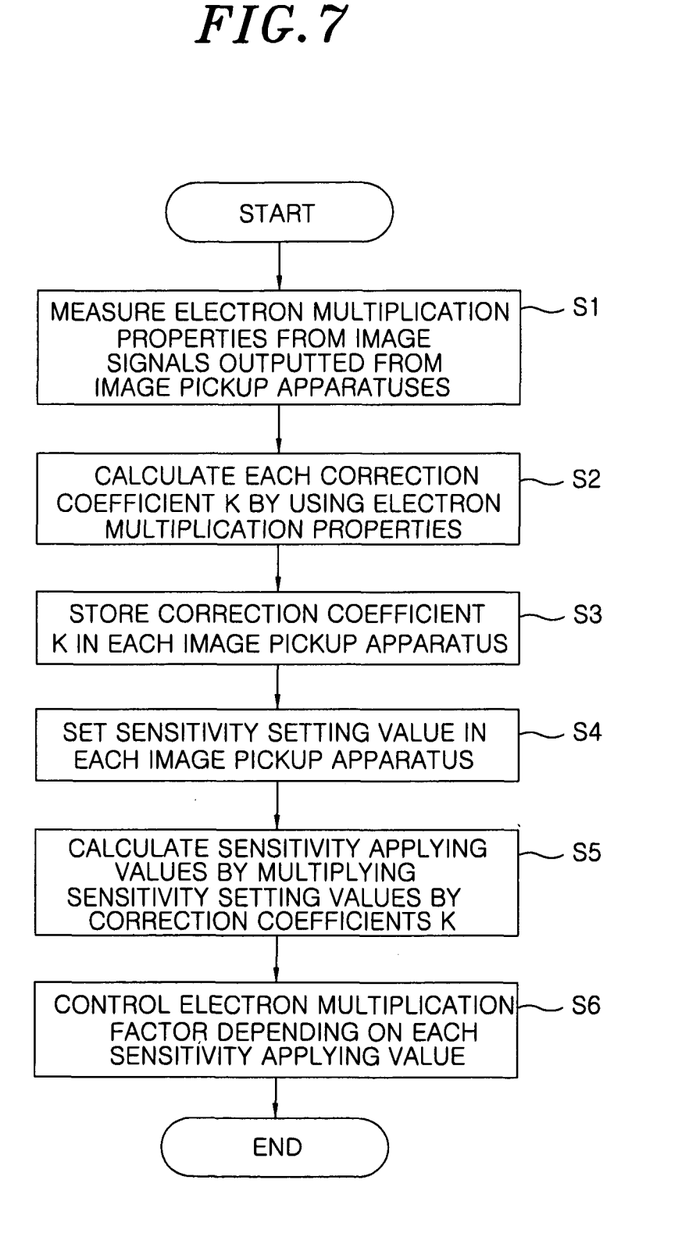
FIG. 7 is a flowchart showing a imaging process performed by using a correction coefficient in accordance with the first embodiment of the present invention.

FIG. 2 is a block diagram showing an example of a structure of an image pickup system in accordance with another embodiment of the present invention, and FIG. 4 is a graph showing electron multiplication properties of image pickup apparatuses before being corrected in accordance with the embodiment of the present invention. FIG. 5 is a graph showing electron multiplication properties of the image pickup apparatuses after being corrected in accordance with the embodiment of the present invention, and FIG. 6 is a matrix view showing a relationship between a sensitivity setting value and a corrected sensitivity applying value of the image pickup apparatus in accordance with the embodiment of the present invention. FIG. 7 is a flowchart showing a process of the sensitivity correction performed by the image pickup system in accordance with the embodiment of the present invention.

As shown in FIG. 2, the image pickup system of the present embodiment includes image pickup apparatuses 1; and a correction coefficient calculating device 4. The correction coefficient calculating device 4 includes a measuring unit 401 for measuring an electron multiplication property from an image signal; and a calculating unit 402 for calculating a correction coefficient K that is used to correct the electron multiplication property.

Before the typical imaging operation is started, in an adjustment step, the electron multiplication properties of the plural image pickup apparatuses 1-1 to 1-5 are obtained and the correction coefficient K is calculated for each of the image pickup apparatuses 1-1 to 1-5 in order to reduce sensitivity differences among the image pickup apparatuses 1-1 to 1-5.

Referring to FIG. 1, the image pickup apparatuses 1-1 to 1-5 take images of target object areas and compress resultant image data in a predetermined format to transmit the data to the control center 3 through the network 2. The operation unit 301 of the control center 3 measures the electron multiplication properties of the image pickup apparatuses 1-1 to 1-5 and calculates the correction coefficients K to adjust the electron multiplication properties of the image pickup apparatuses 1 except for one of the image pickup apparatuses 1 selected as the reference apparatus to conform to that of the reference image pickup apparatus; and transmits the respective correction coefficients K to the image pickup apparatuses 1 and allow the image pickup apparatuses 1 to store the respective correction coefficients K.

Alternatively, referring to FIG. 2, the image pickup apparatuses 1-1 to 1-5 take images of target object areas and output resultant image signals to the correction coefficient calculating device 4. In the correction coefficient calculating device 4, the measuring unit 401 measures the electron multiplication properties of the image pickup apparatuses 1-1 to 1-5 and selects one of the image pickup apparatuses 1 as the reference apparatus. Then, the calculating unit 402 calculates the correction coefficients K to adjust the electron multiplication properties of the other image pickup apparatuses 1 to conform to that of the reference image pickup apparatus; and transmits the respective correction coefficients K to the image pickup apparatuses 1 except for the reference image pickup apparatus and allow the image pickup apparatuses 1 to respectively store the correction coefficients K.

In the present embodiment, no correction coefficient K is transmitted to the reference image pickup apparatus 1. Alternatively, the correction coefficient K for the reference image pickup apparatus 1 may be output as "1" and transmitted to the reference image pickup apparatus 1.

As described above, the electron multiplication properties of the image pickup apparatuses 1-1 to 1-5 are respectively measured from image data output from the image signal output units 107 of the image pickup apparatuses 1-1 to 1-5. Then, the correction coefficients for reducing or removing the differences between the electron multiplication properties of the image pickup apparatuses 1-1 to 1-5 are respectively calculated and stored in the memory units 112 of the image pickup apparatuses 1-1 to 1-5.

In each of the image pickup apparatuses 1-1 to 1-5 shown in FIG. 3, the sensitivity setting unit 113 is operated by an operator to determine a sensitivity setting value. If the sensitivity setting value is determined, the sensitivity setting unit 113 outputs to the control unit 109 a sensitivity setting value signal based on the determined sensitivity setting value. If the sensitivity setting value signal is received, the control unit 19 reads out the correction coefficient K stored in the memory unit 112; and calculates a sensitivity applying value by multiplying the sensitivity setting value by the correction coefficient K to output to the CCD driving unit 108 a control signal of the electron multiplication factor based on the sensitivity applying value. Depending on the received control signal of the electron multiplication factor, the CCD driving unit 108 drives the EM-CCD 102 and controls the electron multiplication factor.

Alternatively, the memory unit 112 may store a mapping table shown in FIG. 6, and the control unit 109 may read out from the mapping table a value corrected depending on the received sensitivity setting value and output it to the CCD driving unit 108. Further, FIG. 6 shows tables which maps sensitivity setting values calculated based on an electron multiplication gain of 30 dB to sensitivity applying values. When the sensitivity setting values are calculated based on a different value as the electron multiplication gain, the sensitivity setting values may be slightly varied.

When the electron multiplication property of the EM-CCD is measured, it is preferable to use an image signal output by increasing the brightness of the image. For the increase in the brightness of the image, the amount of the incident light is reduced by tightening the diaphragm of the lens part 101, the noise removing level of the CDS unit 103 is increased; and the amplification factor of the amplifier unit 104 is increased. The reason is that the aging of EM-CCD is intensified when the electron multiplication factor becomes increased (an increased charge multiplication gate (CMG) voltage is applied to a multiplication resistor of the EM-CCD), in case that a large amount of light is come into the EM-CCD.

Further, for the aged EM-CCD, it is required to use a higher CMG voltage in order to make the electron multiplication uniform. Herein, the CMG voltage serves as a voltage for electron multiplication to be applied to the multiplication resistor of the EM-CCD. The higher CMG voltage causes the electron multiplication factor to be increased.

FIG. 4 is a graph showing the obtained electron multiplication properties of the image pickup apparatuses 1-1 to 1-5 where the vertical axis denotes the electron multiplication gain (dB) and the horizontal axis denotes the sensitivity setting value (point). Here, the electron multiplication gain is a value in unit of decibel (dB) indicating an electron multiplication factor of an image output level in each of the sensitivity setting values of the image pickup apparatuses with regard to the image output level in the sensitivity setting value of the image pickup apparatus which is set as "0." Curves "1," "2," "3," "4," and "5" respectively denote the electron multiplication properties of the image pickup apparatuses 1-1 to 1-5.

As described above, sensitivity differences may occur in images output from the image pickup apparatuses 1-1 to 1-5 due to variations of the EM-CCDs thereof. For example, when the sensitivity setting value of each of the image pickup apparatuses 1-1 to 1-5 is 400 point, the electron multiplication gains of the image pickup apparatuses 1-1 to 1-5 are about 40, 30, 40, 35 and 35 dB, respectively. Moreover, for example, when the electron multiplication gains of the image pickup apparatuses 1 are 30 dB, the sensitivity setting values of the image pickup apparatuses 1-1 to 1-5 are about 350, 400, 350, 370 and 370 point, respectively. All values referred to hereinafter are approximately estimated values and "about" preceding the approximated values will be omitted hereinafter.

Further, for example, when each of the electron multiplication gains of the image pickup apparatuses 1 has its peak value, the sensitivity setting values of the image pickup apparatuses 1-1 to 1-5 are 530, 590, 530, 560 and 570 point. The image pickup apparatus 1-1 may have approximately same electron multiplication properties as those of the image pickup apparatus 1-3, and thus the pair of the apparatuses 1-1 and 1-3 will be described together.

In the present embodiment, for example, the image pickup apparatus 1-2 having the gentlest gradient of the electron multiplication property curve "2" is taken as the reference image pickup apparatus, and the correction coefficients K are respectively calculated to adjust the electron multiplication property curves "1," "3," "4" and "5" of the image pickup apparatuses 1-1, 1-3, 1-4 and 1-5 to conform to the electron multiplication property curve "2" of the image pickup apparatus 1-2.

However, the reference image pickup apparatus is not limited to the image pickup apparatus having the gentlest gradient of the electron multiplication property curve. For example, the image pickup apparatus having the steepest gradient of the electron multiplication property curve, a gradient of the curve that is in an intermediate range or the like may be set as the reference image pickup apparatus.

Alternatively, without determining an image pickup apparatus as the reference, an ideal or average electron multiplication property curve may be used for the reference, so that each image pickup apparatus is adjusted based on the ideal or average electron multiplication property curve. Further, the reference image pickup apparatus or the reference electron multiplication property curve may be determined by an operator in advance or when necessary, or automatically by the control center or the correction coefficient calculating device.

The correction coefficient K will be calculated with respect to an electron multiplication gain by dividing a sensitivity setting value of a target image pickup apparatus to be corrected (hereinafter, referred to as "target image pickup apparatus") by that of the reference image pickup apparatus, as defined below:

$$K=(\text{sensitivity setting value of the target image pickup apparatus})/(\text{sensitivity setting value of the reference image pickup apparatus}) \quad \text{Eq. 1.}$$

The sensitivity applying value that has been corrected to be actually applied can be calculated by multiplying the sensitivity setting value of the target image pickup apparatus by the correction coefficient K calculated by using Eq. 1, as defined below:

$$\text{Sensitivity applying value} = (\text{sensitivity setting value of the target image pickup apparatus}) \times K \quad \text{Eq. 2.}$$

Although variations exist in the electron multiplication properties of the EM-CCDs, the electron multiplication properties may be respectively plotted as substantially same curves. Therefore, the correction coefficient K calculated based on an arbitrarily selected value, e.g., a peak value, on a reference electron multiplication property curve may be applied to other values than the peak value.

The image pickup apparatus 1-1 to 1-5 respectively have their peak values of the electron multiplication gains when the sensitivity setting values have 530, 590, 530, 560, and 570.

As a result of calculating the correction coefficients K by using Eq. 1, the correction coefficients K are respectively obtained as 0.90 (=530/590), 0.95 (=560/590), and 0.97 (=570/590) for the image pickup apparatuses 1-1 and 1-3, 1-4, and 1-5. Further, as a result of calculating the sensitivity applying values by using Eq. 2, when the sensitivity setting value is calculated as 500, the sensitivity applying values are respectively obtained as about 450 point (=500×0.90), 475 point (=500×0.95), and 485 point (=500×0.97) for the image pickup apparatuses 1-1 and 1-3, 1-4, and 1-5.

When the cases of using a sensitivity setting value having an electron multiplication gain of 30 dB and the maximum value are compared, slight differences may be found in the correction coefficients and the sensitivity applying values. However, thus-generated differences in the sensitivity (brightness) of images are too slight for human eyes to recognize, thereby causing no problem in the monitoring process. Accordingly, the correction coefficients and the sensitivity applying values in the cases are not required to be accurately identical to each other (actually, they are not accurately identical to each other).

By calculating the sensitivity applying value in such way, the electron multiplication gains of the image pickup apparatuses 1-1 to 1-5 with regard to any sensitivity setting values become substantially same as shown in FIG. 5 and, thus, the electron multiplication properties of the image pickup apparatuses 1-1 to 1-5 become substantially same. Specifically, although the sensitivity setting value set by an operator is displayed as 500 point, i.e., in the case of the sensitivity setting value of 500 point, the EM-CCD 102 is controlled in each of the image pickup apparatuses 1 by using an electron multiplication factor corresponding to the corrected sensitivity value, e.g., the sensitivity applying value (e.g., 450 point for the apparatuses 1-1 and 1-3, 475 point for the apparatus 1-4, and 485 point for the apparatus 1-5).

With reference to FIG. 7, an imaging process performed by using the method of calculating the correction coefficient K will be described.

In step S1, electron multiplication properties are respectively measured from image signals output from the image pickup apparatuses 1-1 to 1-5. In step S2, the correction coefficients K are respectively calculated such that the measured electron multiplication properties of the image pickup apparatuses 1-1 to 1-5 conform to that of the reference image pickup apparatus. In step S3, the image pickup apparatuses 1-1 to 1-5 are respectively allowed to store the corresponding correction coefficients K.

In step S4, sensitivity setting values of the image pickup apparatuses 1-1 to 1-5 are identically set. In step S5, sensitivity applying values are respectively calculated by multiplying the sensitivity setting values for the apparatus 1-1 to 1-5 by, the corresponding correction coefficients K. In step S6, the image pickup apparatuses 1-1 to 1-5 pick up images by controlling the electron multiplication factors depending on the corresponding sensitivity applying values, respectively.

As described above, in accordance with the first embodiment, it is possible to provide a plurality of image pickup apparatuses, capable of outputting images with reduced sensitivity differences.

Second Embodiment

As the image pickup apparatuses of the first embodiment are used, the EM-CCDs therein have been aged, causing the electron multiplication properties to be changed. Further, as described in the above, such aging progression states are affected by the amount of incident light and the electron multiplication factor. Accordingly, the aging progression states of the image pickup apparatuses are differently changed by their environmental conditions and using statuses, making the electron multiplication properties non-uniform.

In accordance with a second embodiment of the present invention, it is possible to provide an image pickup system, an image pickup apparatus and a sensitivity control method, capable of unifying the sensitivities (brightnesses) of output images by respectively correcting sensitivity setting values of image pickup apparatuses including EM-CCDs whose electron multiplication properties become non-uniformly deteriorated due to their aging.

Figure 8:
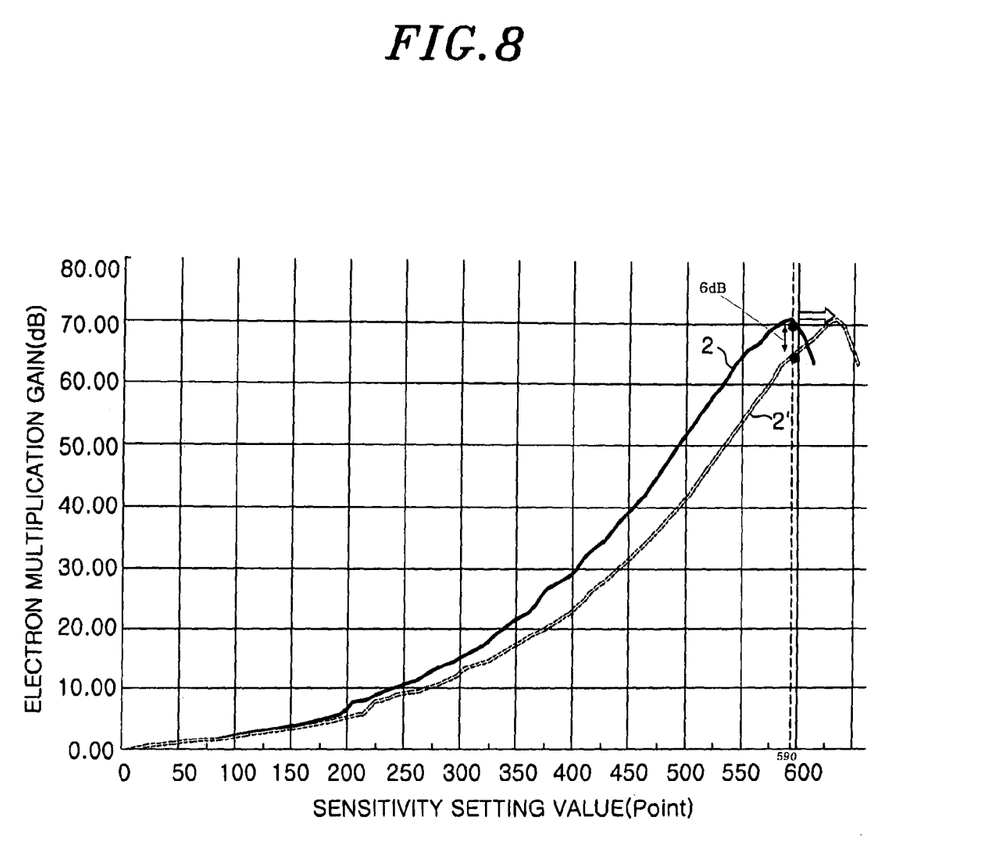
FIG. 8 is a graph showing electron multiplication properties of an image pickup apparatus before and after it is aged in accordance with a second embodiment of the present invention.

FIG. 8 is a graph showing electron multiplication properties of an image pickup apparatus before and after it is aged in accordance with the second embodiment of the present invention. In the present embodiment, a state of the electron multiplication property of, e.g., the aged image pickup apparatus 1-2 and its corrected state will be described.

As shown in FIG. 8, the electron multiplication property of the image pickup apparatus 1-2 is deteriorated depending on its using status and elapsed time. Further, even when the sensitivity setting values are identically set (the same CMG voltage is supplied thereto), the electron multiplication gains slowly become decreased and their property curves are shifted in the right direction.

The other image pickup apparatuses 1-1 and 1-3 to 1-5 also become deteriorated for the same reason. If it is assumed that the image pickup apparatuses 1-1 to 1-5 have the same initial electron multiplication properties and they are identically used with the same elapsed time under the same environmental conditions, the images having substantially same sensitivities (brightnesses) are respectively output therefrom. Since, however, it is often the case that they are differently used with different elapsed time under the different environmental conditions, their aging statuses become differently changed, making the electron multiplication property curves different as shown in FIG. 4.

Accordingly, the electron multiplication properties of the image pickup apparatuses 1-1 to 1-5 are re-measured and corrected by using the method of the first embodiment, so that the electron multiplication gains of the image pickup apparatuses 1-1 to 1-5 for a sensitivity setting value can be made substantially uniform. Further, it is possible to output images with reduced sensitivity differences.

As such, although the EM-CCDs are aged, it is possible, in the present embodiment, to provide a plurality of image pickup apparatuses, capable of outputting images with reduced sensitivity differences.

Although the EM-CCDs are aged, the images having uniform sensitivities may be respectively output from the image pickup apparatus by using the above-described method. However, the image pickup apparatus that has been aged to a predetermined extent is required to be replaced with new one. Practically, it is preferable to replace the aged image pickup apparatus whose electron multiplication gain is decreased by about 6 dB.

As shown in FIG. 8, curves "2" and "2'" respectively show the electron multiplication properties of the image pickup apparatus 1-2 before and after it is aged. In the present embodiment, an alarm for reporting that it is necessary to replace the aged apparatus is notified when the electron multiplication property is changed from the curve "2" having, e.g., the peak value of the electron multiplication gain at the sensitivity setting value of 590 point before the aging to the curve "2'" having a value of the electron multiplication gain reduced by 6 dB at the sensitivity setting value of 590 point after the aging.

Similarly to the first embodiment, the image pickup system of the second embodiment includes a plurality of electron multiplication image pickup apparatuses 1-1 to 1-5; and a correction coefficient calculating device 4 for measuring electron multiplication properties of image signals output from the electron multiplication image pickup apparatuses 1-1 to 1-5, calculating correction coefficients that are used to adjust the sensitivity of image signals from the electron multiplication apparatus, and respectively setting the calculated correction coefficients in the electron multiplication image pickup apparatuses 1-1 to 1-5.

The correction coefficient calculating device 4 measuring electron multiplication properties of image signals output from the electron multiplication image pickup apparatuses 1-1 to 1-5 on a regular basis, and compares an initially measured electron multiplication property with a most recently measured electron multiplication property for each of the apparatuses and, if the difference between the initially measured electron multiplication property and the most recently measured electron multiplication property is equal to or greater than a threshold, outputs an alarm signal to the outside. Further, the correction coefficient calculating device 4 controls each of the apparatuses 1-1 to 1-5 such that the difference between the initially measured electron multiplication property and the most recently measured electron multiplication property does not exceed a threshold value.

At this time, such alarm may be notified of the system by outputting a sound, generating a light from a light-emitting diode (LED) provided in the image pickup apparatus 1 and/or outputting (displaying) the image signal overlapping with alarm information. Further, such alarm notification may be realized by displaying the image signal added with a visual effect such as a colorful frame and/or additionally outputting an alarm signal.

As such, the alarm notification is used in the present embodiment when the EM-CCD is aged beyond the allowable level, thereby providing an efficient maintenance service.

The image pickup apparatus 1 of the present embodiment includes the EM-CCD 102 for obtaining an image signal by performing a photoelectric conversion on an incident light and carrying out an electron multiplication on the image signal at a electron multiplication factor to generate an image signal output; the memory unit 112 for storing a correction coefficient; the sensitivity setting unit 113 for setting a sensitivity value for the image signal; and the control unit 109 for controlling the EM-CCD 102 based on a value obtained by multiplying the sensitivity value by the correction coefficient stored in the memory unit 112.

The control unit 109 of the image pickup apparatus 1 regularly receives electron multiplication properties measured outside the apparatus; and compares an initially measured electron multiplication property with a most recently measured electron multiplication property for each of the apparatuses 1-1 to 1-5 and, if the difference between the initially measured electron multiplication property and the most recently measured electron multiplication property is equal to or greater than a threshold, outputs an alarm signal to the outside. Further, the control unit 109 controls the EM-CCD 102 such that the difference between the initially measured electron multiplication property and the most recently measured electron multiplication property does not exceed a threshold value.

Hereinafter, a sensitivity control method of the present embodiment will be described.

First, electron multiplication properties of an image signal output from an electron multiplication image pickup apparatus are measured on a regular basis. Then, an initially measured electron multiplication property is compared with a most recently measured electron multiplication property. If the difference between the initially measured electron multiplication property and the most recently measured electron multiplication property is equal to or greater than a threshold, an alarm signal is output to the outside. Further, the electron multiplication image pickup apparatus is controlled such that the difference between the initially measured electron multiplication property and the most recently measured electron multiplication property does not exceed a threshold value.

In the meantime, instead of continuously correcting the sensitivity setting value to overcome the aging, it is preferable to preset a lower limit (e.g., −6 dB as compared with the electron multiplication property for a sensitivity setting value before the aging in the present embodiment) and control the electron multiplication property not to be reduced beyond the lower limit. If the electron multiplication property is reduced beyond the lower limit, practical problem may occur in the EM-CCD.

As shown in FIG. 8, the curve "2'" of the electron multiplication property after the aging shows the case of being reduced by 6 dB with regard to the peak value of the curve "2" of the electron multiplication property before the aging. Since the lower limit is preset as −6 dB in the present embodiment, the CMG voltage is automatically increased such that the electron multiplication property curve is not shifted further to the right beyond the curve "2'."

As such, although the EM-CCD is aged, it is possible, in the present embodiment, to continuously recognize the image by maintaining the practically allowable lower limit.

Further, an upper limit is typically preset to control the electron multiplication properties because it is important that the electron multiplication factor and the CMG voltage are not increased more than necessary to suppress the aging of the EM-CCD. In the present embodiment, the upper limit of the CMG voltage is preset such that the electron multiplication gain reaches, e.g., 40.00 dB. Besides, since the CMG voltage that is required to maintain the electron multiplication gain as 40.00 dB is also increased due to the aging of the EM-CCD, the upper limit of the CMG voltage is shifted as the EM-CCD is aged.

As such, by shifting the upper limit of the CMG voltage depending on the aging of the EM-CCD, it is possible to control the electron multiplication gain and the electron multiplication factor within respective desired adequate ranges. It is also possible to extend the lifespan of the products by suppressing the aging of the EM-CCD.

The same configuration and functions are applied to the other image pickup apparatuses 1-1 and 1-3 to 1-5.

The present invention is not limited to each of the above embodiments. In the above embodiments, the electron multiplication factor is varied by calculating the correction coefficient and thus correcting the sensitivity setting value. The sensitivity, however, may be varied by various other factors. For example, to achieve the object of the present invention, the voltage supplied to cool or heat the temperature control unit 110 or the diaphragm of the lens part 101 may be controlled.

In the case of varying the voltage supplied to the temperature control unit, a control signal is output to the temperature control unit 110, the control signal serving to supply a predetermined voltage by referring to a mapping table stored in the memory unit 112, which maps the sensitivity applying values calculated by correcting the sensitivity setting values set in the sensitivity setting unit 113 to the temperatures detected by the temperature detecting unit 111.

In the case of controlling the diaphragm of the lens part 101, a control value is output to a lens control unit (not shown) to control the diaphragm of the lens part 101, the control value being adjusted depending on the sensitivity applying values calculated by correcting the sensitivity setting values set in the sensitivity setting unit 113, by referring to a mapping table stored in the memory unit 112, which maps the calculated sensitivity applying values to control values.

Here, the sensitivity is also varied depending on a weather condition such as temperature and aging. Accordingly, it is preferable to measure and correct the electron multiplication properties on a regular basis. Alternatively, it is preferable to pre-calculate and store the correction coefficients depending on weather and/or time condition and correct the electron multiplication properties by varying the correction coefficients depending on the weather and/or time condition of a specific day.

Although the electron multiplying-charge coupled device is used in the above embodiments, the present invention is applicable to an image pickup apparatus using a typical charge-coupled device (CCD) or a complementary metal-oxide-semiconductor (CMOS). Various modifications in its configuration, process sequence and contents may be made without departing from the scope of the invention.

Briefly, the present invention is not limited to each of the above embodiments themselves, and each step may be embodied by modifying the elements without departing from the scope of the invention. Further, various modifications are possible by adequately combining the plural elements disclosed in each embodiment. For example, some elements may be removed from each embodiment, or any combination of the elements of different embodiments may be made.

What is claimed is:

1. An image pickup system comprising:
a plurality of electron multiplication image pickup apparatuses; and
a correction coefficient calculating device for measuring electron multiplication properties of image signals output from the electron multiplication image pickup apparatuses, calculating correction coefficients that are used to adjust the sensitivity of image signals from the electron multiplication apparatus, and setting the calculated correction coefficients in the electron multiplication image pickup apparatuses.

2. The image pickup system of claim 1, wherein the correction coefficient calculating device measures electron multiplication properties of image signals output from the electron multiplication image pickup apparatuses on a regular basis, and compares an initially measured electron multiplication property with a most recently measured electron multiplication property for each of the electron multiplication image pickup apparatuses and, if the difference between the initially measured electron multiplication property and the most recently measured electron multiplication property is equal to or greater than a threshold, outputs an alarm signal to the outside.

3. The image pickup system of claim 1, wherein the correction coefficient calculating device measures electron multiplication properties of image signals output from the electron multiplication image pickup apparatuses on a regular basis, and compares an initially measured electron multiplication property with a most recently measured electron multiplication property for each of the electron multiplication image pickup apparatuses and controls each of the electron multiplication image pickup apparatuses such that the difference between the initially measured electron multiplication property and the most recently measured electron multiplication property does not exceed a threshold value.

4. An image pickup apparatus for outputting an image signal comprising:
an electron multiplying charge coupled device for obtaining an electric signal by performing a photoelectric conversion on an incident light and carrying out an electron multiplication on the electric signal at an electron multiplication factor to generate a multiplied electric signal to be converted into the image signal;
a memory unit for storing a correction coefficient acquired from outside the image pickup apparatus based on the image signal output from the image pickup apparatus;
a sensitivity setting unit for setting a sensitivity value for the image signal; and
a control unit for controlling the electron multiplying-charge coupled device based on a value obtained by multiplying the sensitivity value by the correction coefficient stored in the memory unit.

5. The image pickup apparatus of claim 4, wherein the control unit regularly receives electron multiplication properties measured outside the image pickup apparatus; and compares an initially measured electron multiplication property with a most recently measured electron multiplication property for each of the image pickup apparatuses and, if the difference between the initially measured electron multiplication property and the most recently measured electron multiplication property is equal to or greater than a threshold, outputs an alarm signal to the outside.

6. The image pickup apparatus of claim 4, wherein the control unit regularly receives electron multiplication properties measured outside the image pickup apparatus; and compares an initially measured electron multiplication property with a most recently measured electron multiplication property for each of the image pickup apparatuses and controls each of the image pickup apparatuses such that the difference between the initially measured electron multiplication property and the most recently measured electron multiplication property does not exceed a threshold value.

7. A sensitivity control method comprising:
measuring electron multiplication properties of an image signal output from an electron multiplication image pickup apparatus;
setting a sensitivity value for the image signal;
correcting the sensitivity value by multiplying the sensitivity value by a correction coefficient calculated outside the electron multiplication image pickup apparatus based on the measured electron multiplication properties of the image signal; and
controlling the electron multiplication image pickup apparatus based on the corrected sensitivity value.

8. The method of claim 7, wherein the measuring of the electron multiplication properties is performed on a regular basis, and the method further comprises:
comparing an initially measured electron multiplication property with a most recently measured electron multiplication property; and
outputting an alarm signal to the outside, if the difference between the initially measured electron multiplication property and the most recently measured electron multiplication property is equal to or greater than a threshold.

9. The method of claim 7, wherein the measuring of the electron multiplication properties is performed on a regular basis, and the method further comprises:
comparing an initially measured electron multiplication property with a most recently measured electron multiplication property; and
controlling the electron multiplication image pickup apparatus such that the difference between the initially measured electron multiplication property and the most recently measured electron multiplication property does not exceed a threshold value.

* * * * *